United States Patent
Chang (10) Patent No.: US 12,140,818 B2
(45) Date of Patent: Nov. 12, 2024

(54) MULTIFUNCTIONAL MOUNTING ASSEMBLY FOR WRAP-AROUND EYEGLASS FRAMES

(71) Applicant: General Scientific Corp., Ann Arbor, MI (US)

(72) Inventor: Byung J. Chang, Ann Arbor, MI (US)

(73) Assignee: General Scientific Corp., Ann Arbor, MI (US)

( * ) Notice: Subject to any disclaimer, the term of this patent is extended or adjusted under 35 U.S.C. 154(b) by 956 days.

(21) Appl. No.: 17/099,604

(22) Filed: Nov. 16, 2020

(65) Prior Publication Data
US 2021/0124191 A1    Apr. 29, 2021

Related U.S. Application Data

(63) Continuation-in-part of application No. 16/526,001, filed on Jul. 30, 2019, now Pat. No. 11,402,658.

(51) Int. Cl.
G02C 5/02    (2006.01)
G02C 5/12    (2006.01)
G02C 5/14    (2006.01)
G02C 11/02   (2006.01)

(52) U.S. Cl.
CPC ............... *G02C 11/02* (2013.01); *G02C 5/02* (2013.01); *G02C 5/12* (2013.01); *G02C 5/143* (2013.01)

(58) Field of Classification Search
CPC . G02C 11/02; G02C 5/02; G02C 5/12; G02C 5/143; G02C 7/086; G02C 7/088; G02C 5/126; G02C 9/04; G02C 11/04; G02C 2200/08

USPC .................................................. 351/41, 158
See application file for complete search history.

(56) References Cited

U.S. PATENT DOCUMENTS

| | | | | |
|---|---|---|---|---|
| 5,870,166 A | * | 2/1999 | Chang ................... | G02C 7/088 351/158 |
| 7,431,451 B1 | * | 10/2008 | Lin ........................ | G02C 5/122 351/138 |
| 11,402,658 B2 | * | 8/2022 | Chang ................... | G02C 7/088 |

FOREIGN PATENT DOCUMENTS

WO    WO-2004083941 A1 *  9/2004  ............. A61F 9/025

\* cited by examiner

*Primary Examiner* — Tuyen Tra
(74) *Attorney, Agent, or Firm* — Fishman Stewart PLLC (57) ABSTRACT

An optical mounting assembly is adapted for use with wrap-around type eyeglass frames of the type that utilize a single sheet of curved lens material to form right and left lenses which may carry through-the-lens or TTL oculars or loupes. The optical mounting assembly may attach to an existing pair of wrap-around type eyeglass frames, or the invention may include the frames. The bridge portion of the frames and the lens material are sandwiched between front and rear components, with a nose pad component coupled to the rear component. The nose pad component may comprise a pair of bendable wire arms covered with, or terminating in, cushioning material. An illuminator or video camera may couple to the front component. The rear component may be adapted to receive an optical accessory such as a light-blocking or light-admitting filter material.

21 Claims, 9 Drawing Sheets

MULTIFUNCTIONAL MOUNTING ASSEMBLY FOR WRAP-AROUND EYEGLASS FRAMES

REFERENCE TO RELATED APPLICATIONS

This application is a continuation-in-part of U.S. patent application Ser. No. 16/526,001, entitled REMOVABLE, ADJUSTABLE WIRE ARMS FOR NOSE PADS, filed Jul. 30, 2019, the entire content of which is hereby incorporated herein by reference.

FIELD OF THE INVENTION

This invention relates generally to spectacle frames and, more particularly, to a multifunctional mounting assembly for wrap-around frames.

BACKGROUND OF THE INVENTION

My U.S. patent application Ser. No. 16/526,001 discloses various nose-pad configurations for eyeglass frames used in medical and dental professions. The inventions disclosed in this reference improve upon existing nose pad configurations by providing assemblies with removable and replaceable wire arms that attach to different nose pad configurations for enhanced versatility. The nose pad assemblies disclosed therein are configured for use with for a set of eyeglass frames having a bridge portion between right and left lenses. The assemblies includes a plate having front and back surfaces, opposing side edges, and a plurality of through-holes adapted receive fasteners for mounting the plate on the bridge portion of the eyeglass frames. Opposing right and left wire members extend downwardly from a respective one of the side edges of the plate, and wherein each wire member terminates in a coupling mechanism adapted to receive a nose pad. The wire members are manually bendable, enabling a user to independently adjust the distance between the nose pads and the distance of the nose pads from the eyeglass frames. A spacer component may include an upper side-to-side recess or groove to receive a bar connecting drop-in optical component such as prescription lenses or filters to be positioned between the lenses of the eyeglass frames and the eyes of a wearer. The lenses of the eyeglass frames may include through-the-lens (TTL) oculars or loupes.

While the inventions thus described provide numerous configurations to suit different wear geometries for added comfort, the various implementations are primarily adapted to eyeglass frames with separate lenses. The need remains, therefore, for a multifunctional mounting assembly more suited to wrap-around styles of eyeglass frames.

SUMMARY OF THE INVENTION

This invention is directed to an optical mounting assembly adapted for use with wrap-around type eyeglass frames that utilize a single sheet of curved lens material forming right and left lenses. In one embodiment of the invention, the optical mounting assembly attaches to an existing pair of wrap-around type eyeglass frames; alternatively, the invention includes the frames. In the preferred embodiment, the bridge portion of the eyeglass frames is situated in front of the curved lens material forming right and left lenses.

The optical mounting assembly itself includes a front component configured for placement in front of the bridge portion of the eyeglass frames, a rear component configured for placement behind the bridge portion of the eyeglass frames, and one or more fasteners that extend from front component to the rear component, whereby the bridge portion of the frames and the lens material are sandwiched between the front and rear component. A nose pad component is coupled to the rear component. The nose pad component may comprise a pair of bendable wire arms that extend downwardly and outwardly from a plate fastened to the rear component, and may further include a cushioning material covering at least a portion of the bendable wire arms.

The front component may include a structure adapted to receive an optical viewing accessory. For example, the structure may be a slot in the front component adapted to receive a forwardly directed illuminator or video camera. The rear component may also include a structure such as a slot to receive an optical accessory such as a light-blocking or light-admitting filter material configured for disposition between the eyes of a wearer and the lens material, which may further including right and left oculars or loupes that extend through the lens material (i.e., through-the-lens or TTL oculars or loupes).

DETAILED DESCRIPTION OF THE INVENTION

Figure 1:
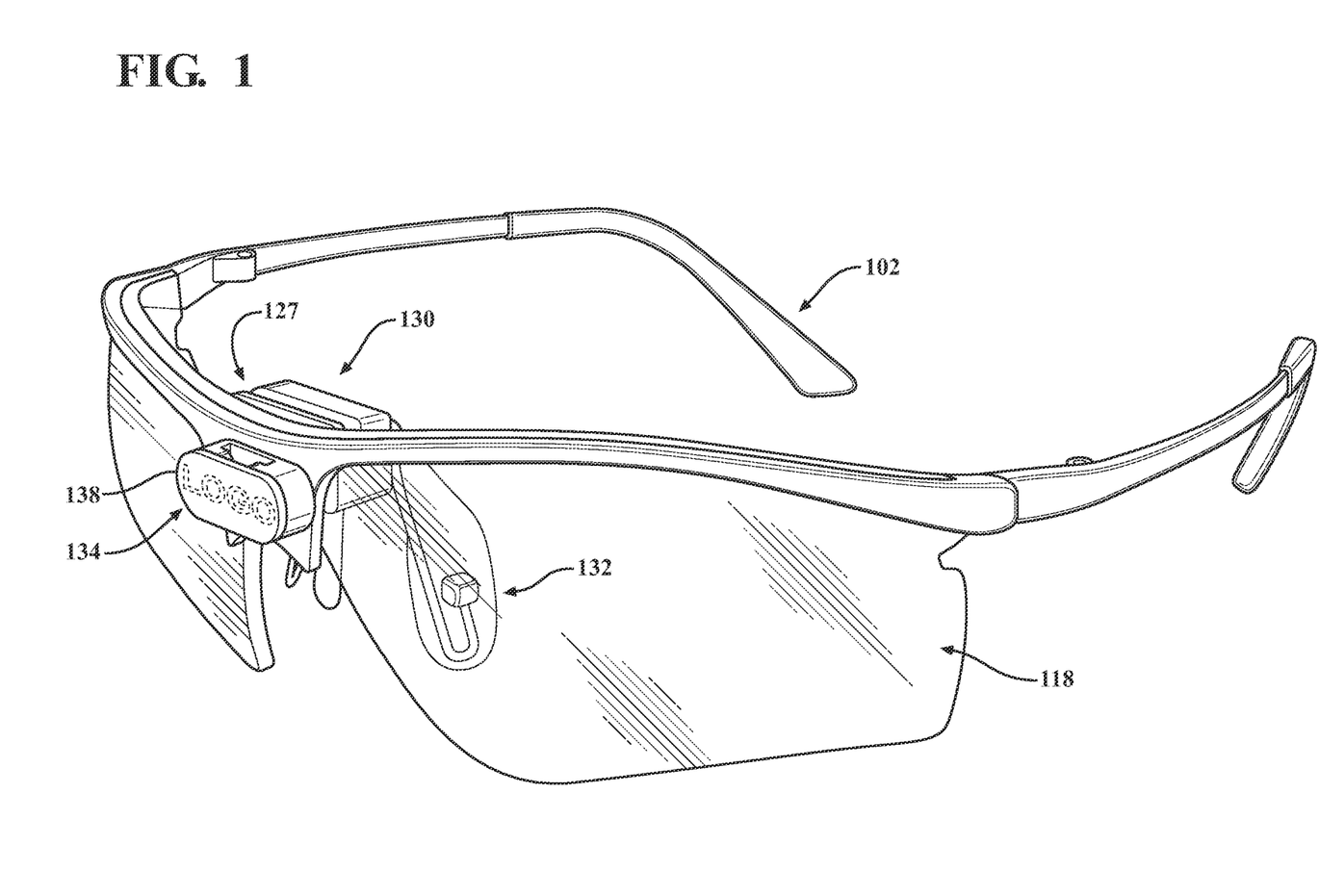
FIG. 1 is a perspective drawing of a preferred embodiment of the invention that illustrates the invention in an assembled form.

This invention improves upon the prior art by providing a multifunctional mounting assembly ideally suited to wrap-around styles of eyeglass frames. FIG. 1 is a perspective drawing of a preferred embodiment of the invention that illustrates the invention in an assembled form. In this assembly, the wrap-around frames are shown at 102, and material that comprises the "lenses" is shown at 118. Note that this invention is not limited in terms of ornamental style or appearance. However, as described in further detail below, the lenses are formed from a single sheet of flexible yet impact-resistant plastic material such as polycarbonate or the like. That is, both the right and left lens portions, which may or not be prescription lenses, are integrated into the same sheet of polymeric material.

Continuing the reference to FIG. 1, the invention includes a front component 134 mounted with respect to the front portion of the eyeglass frames, and a rear component 130 mounted on the rear portion of the eyeglass frames. A nose pad component 132 is mounted on the rearmost surface of rear component 130. In the preferred embodiment, a first set of fasteners is used to hold the front and rear components together, with a portion of the frames 102 and lens material 118 sandwiched therebetween. In FIG. 1, a cap 138 covers the heads of these fasteners. A second set of fasteners, preferably with a different spacing than the first set of fasteners, is used to hold the nose pad assembly 132 to the rear component 130.

Figure 2:
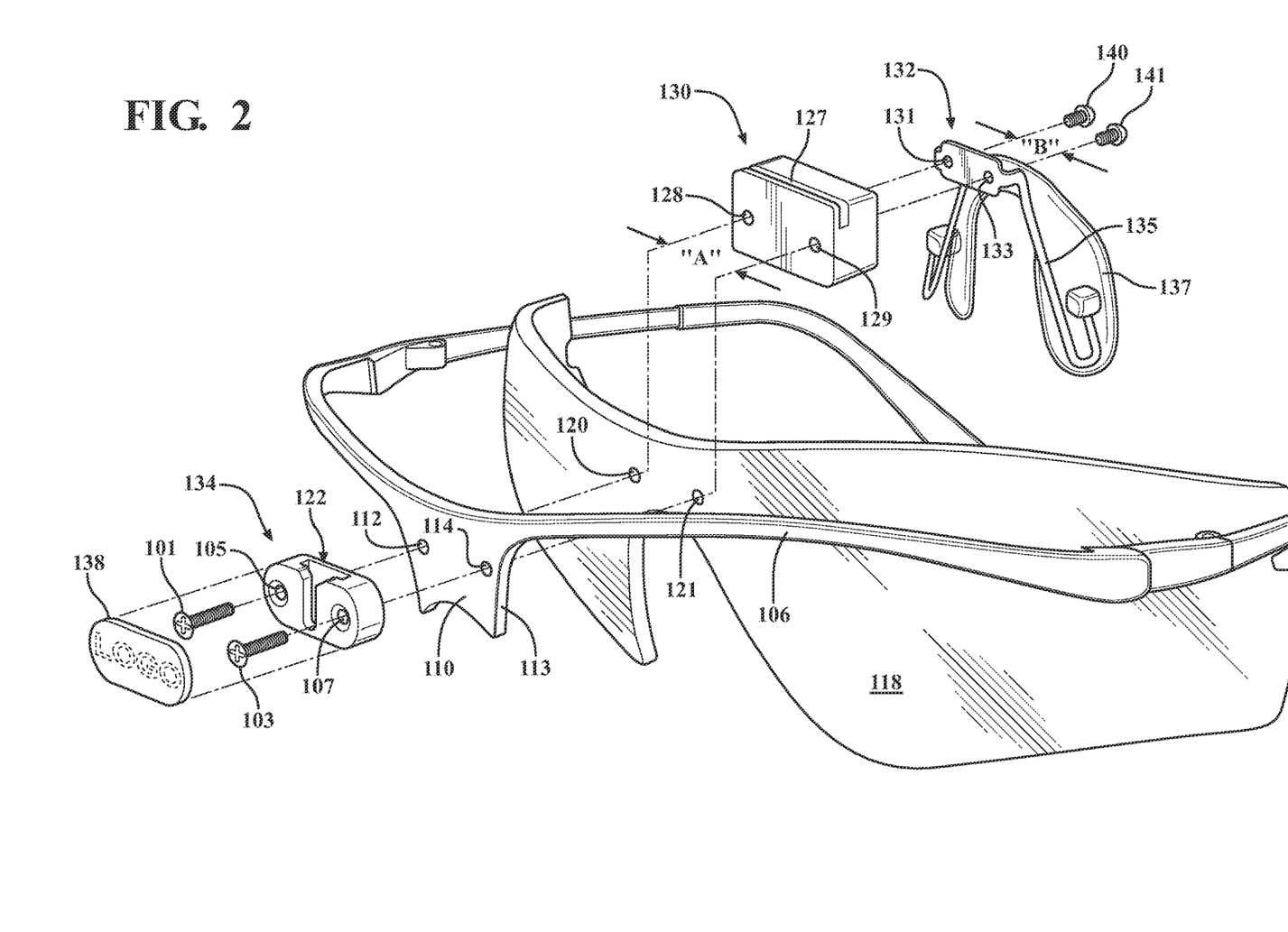
FIG. 2 is an exploded view of the preferred embodiment depicted in FIG. 1.

The alignment of the various components is best seen in the exploded view of FIG. 2. Fasteners 101, 103 extend through holes 105, 107 in front component 134; holes 112, 114 in the bridge portion of the eyeglass frames 106; holes 120, 121 in lens material 118, and finally into threaded holes 128, 129 in the rear component 130. The spacing between the fasteners 101, 103 and corresponding holes is "A." Fasteners 140, 141 extend through corresponding holes 131, 133 in nose-pad assembly 132 and into corresponding holes (not visible) in the back side of rear component 130. Self-tapping screws or threaded holes on the back side of rear component 130 may be used for this purpose. Multiple sets of holes may be provided for alternative nose pad assemblies, though in preferred embodiments, fasteners 140, 141 and the corresponding aligned holes have a spacing of "B" which is less than "A."

While it is possible to have a single set of fasteners perform the functions of fasteners 101, 103 and 140, 141, separate pairs of fasteners are used for greater versatility and to obviate the need for nuts. In the preferred embodiment, the spacing between A and B is different; most preferably, A is greater than B. Though not necessary, bridge portion 110 of the frames 102 may have curved side edges 113 corresponding to the shape of the lens material 118. The lens material may connect to frames 102 in any appropriate manner.

Further, nose pad component 132 may be different from the one depicted in the drawing. Indeed, component 132 may comprise any of the components described in co-pending U.S. application Ser. No. 16/526,001, "REMOVABLE, ADJUSTABLE WIRE ARMS FOR NOSE PADS," incorporated herein by reference. The components disclosed in this '001 Application may include a plate with a plurality of through-holes and opposing right and left wire members 135, each wire member extending downwardly from a respective one of the side edges of the plate, and wherein each wire member terminates in a coupling mechanism adapted to receive a nose pad. The right and left wire members 135 are manually bendable, enabling a user to independently adjust the distance between the nose pads and the distance of the nose pads from the eyeglass frames. Different styles of removable and replaceable cushion materials (i.e., 137) are then coupled to the ends of the wire members. The wire members 135 may also include upward bends as shown in FIG. 3 and as described in the '001 Application referenced above.

Both front and rear mounting components may serve multiple functions. For example, rear component 130 may include an optional slot 127 to receive drop-in optical components such as prescription lenses or band-limiting filters, also described in the pending '001 Application referenced above. Likewise, front component 134 may include a slot 122 or other structure to receive other optical accessories such as magnifying loupes, headlamps, video cameras, or the like. Cap 138, which may include a name or logo.

Figure 3:
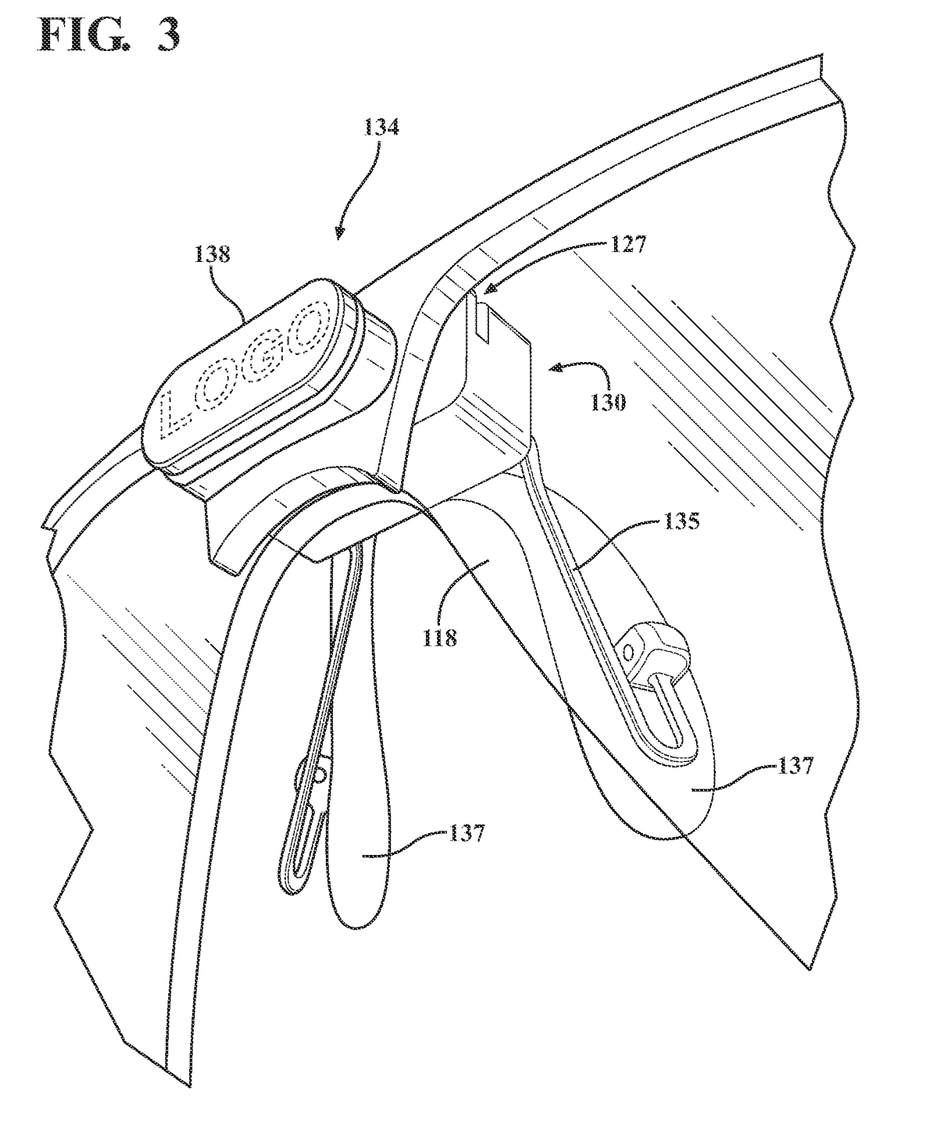
FIG. 3 is a detail drawing of the bridge portion of the eyeglass frames showing the front and rear components.
Figure 4:
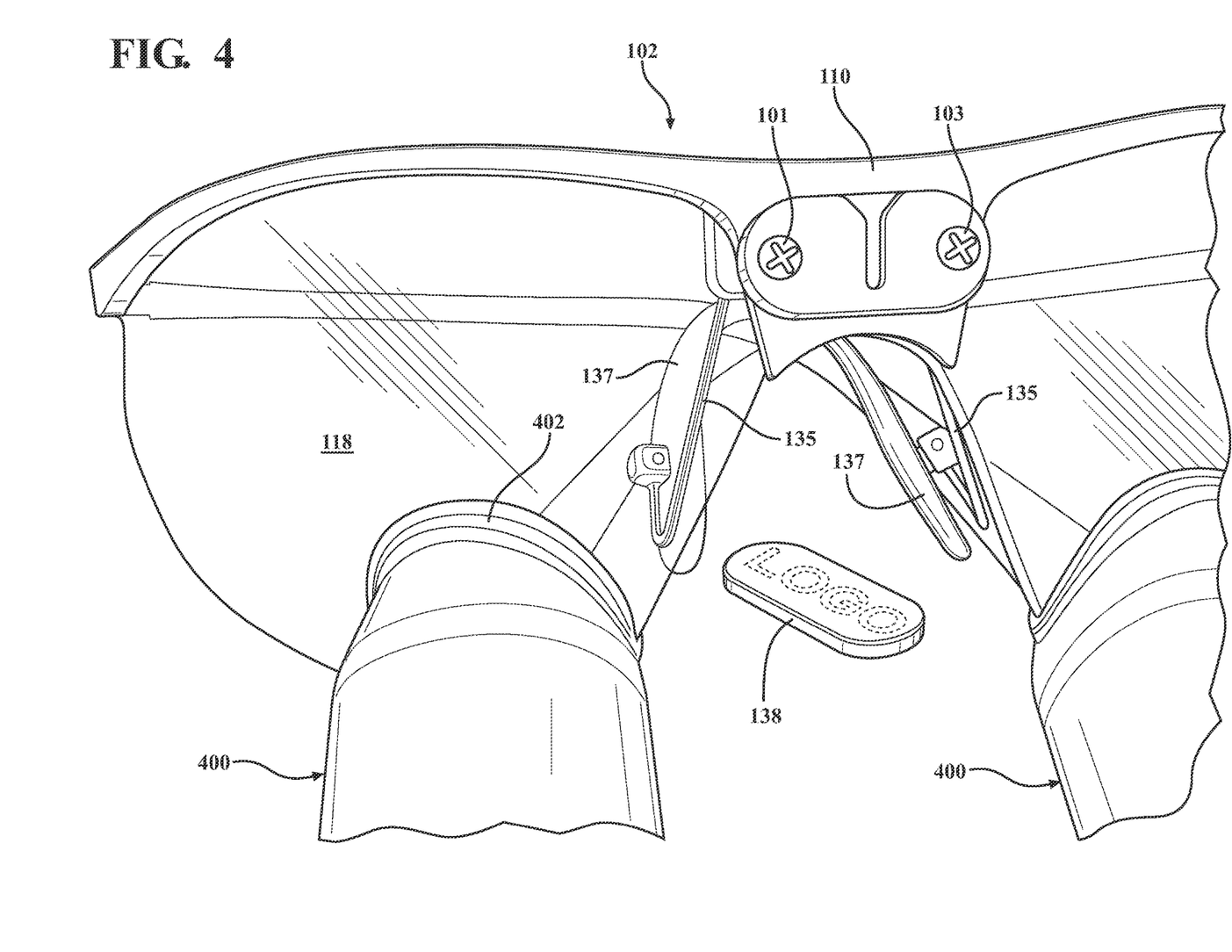
FIG. 4 is a front view of the bridge portion with a cap removed, and also showing the way in which the inventions works with through-the-lens (TTL) loupes.
Figure 5:
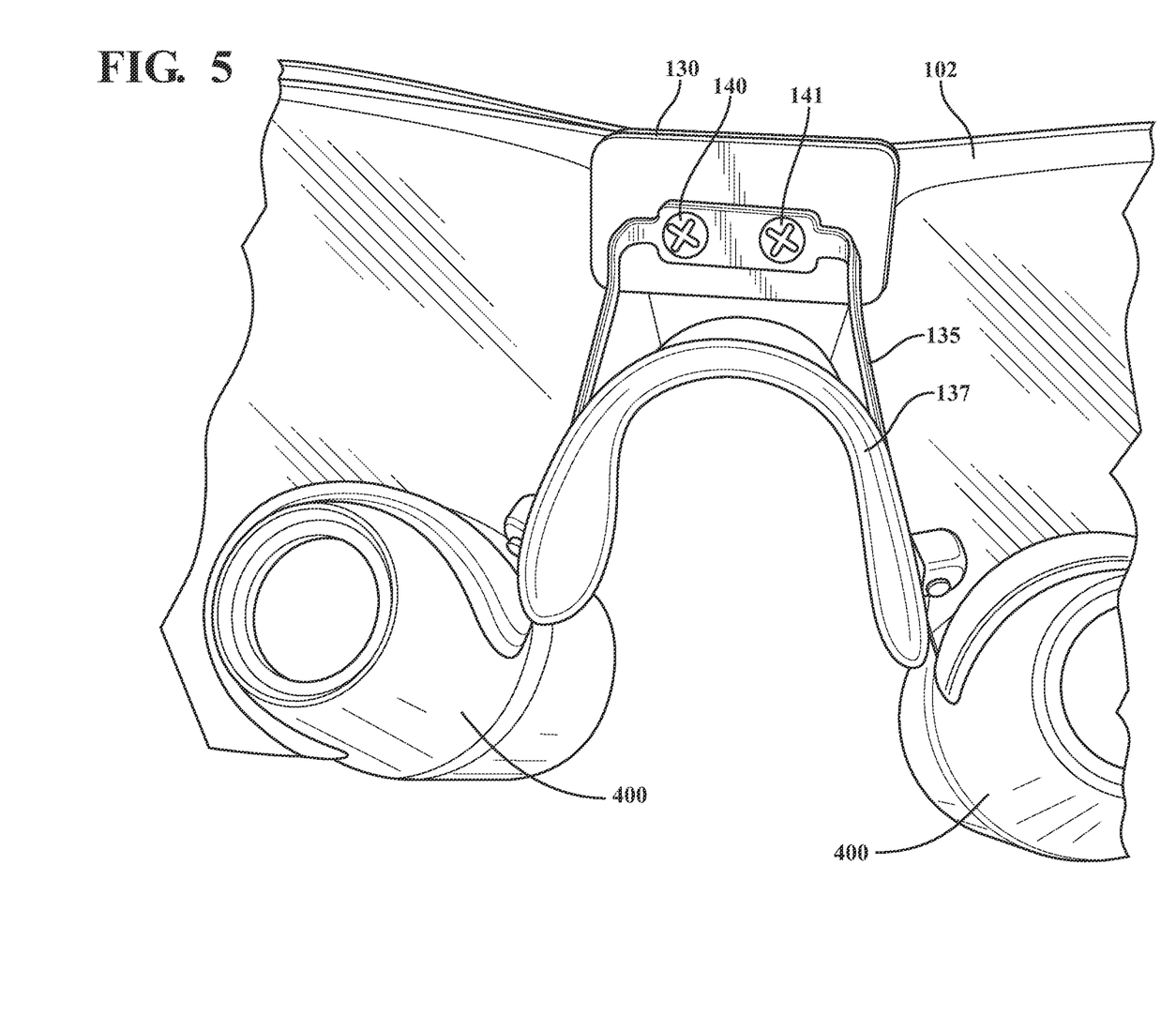
FIG. 5 is a rear view of the bridge portion.
Figure 6:
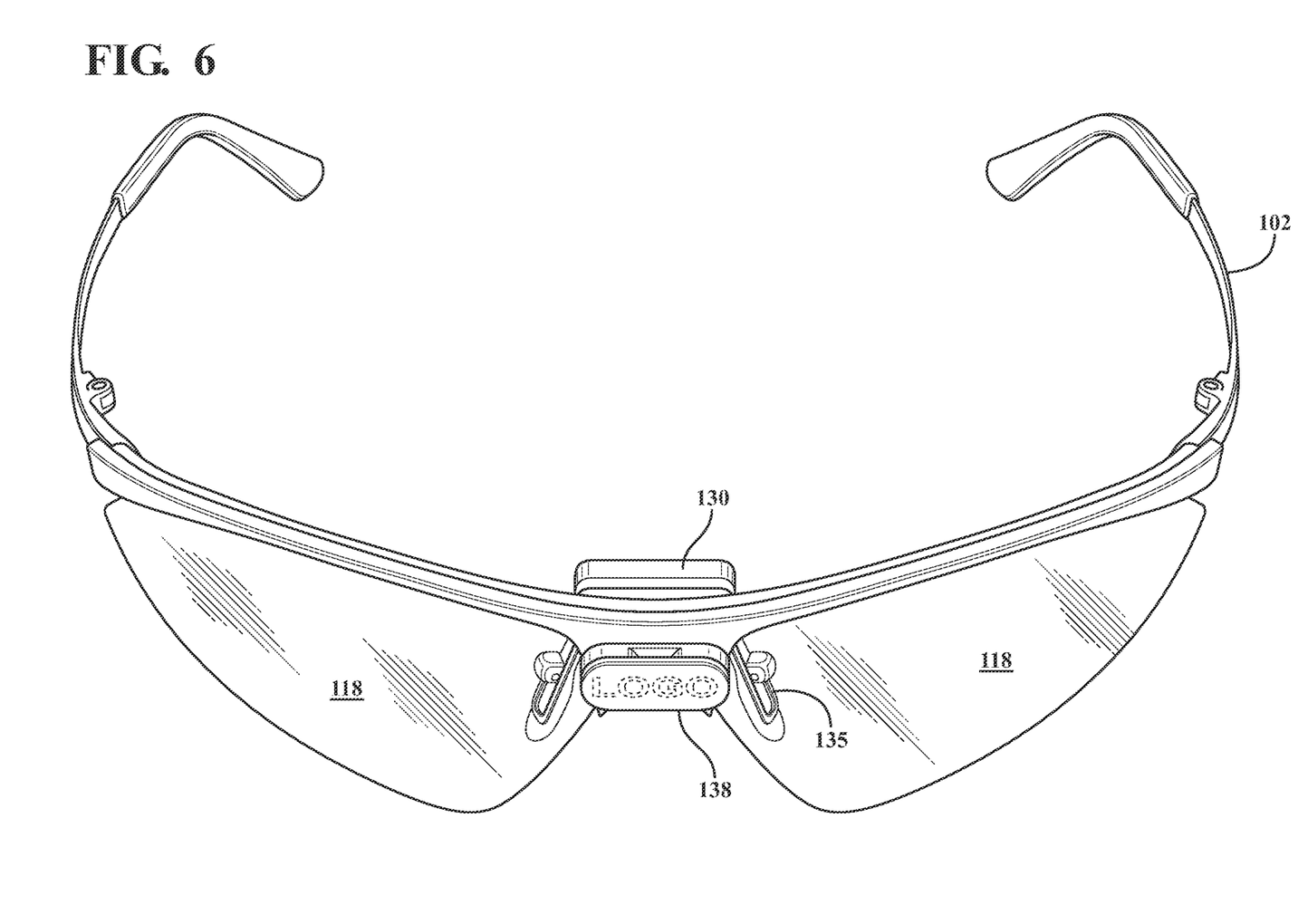
FIG. 6 is a top-down front view of the invention.
Figure 7:
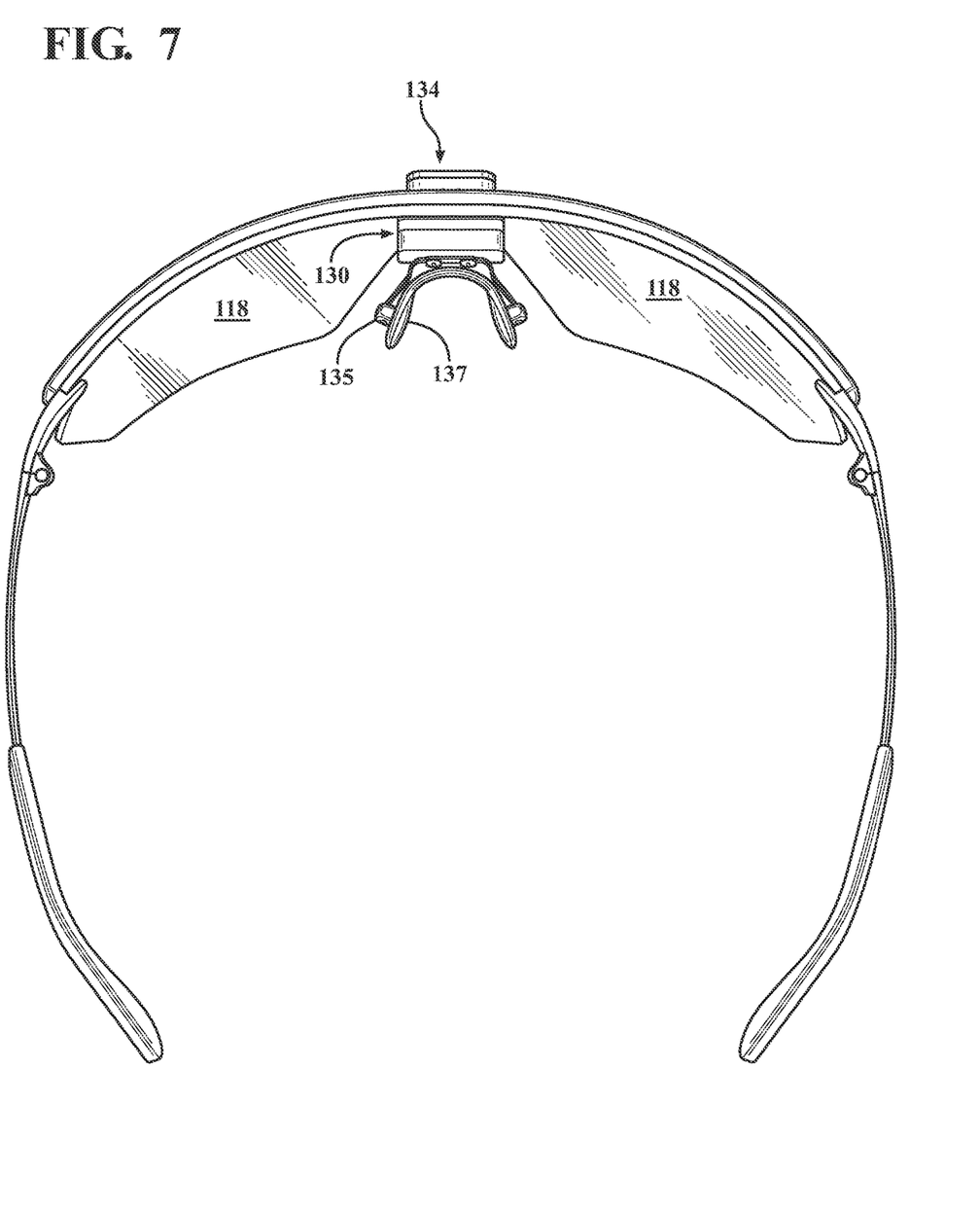
FIG. 7 is a top-down view.
Figure 8:
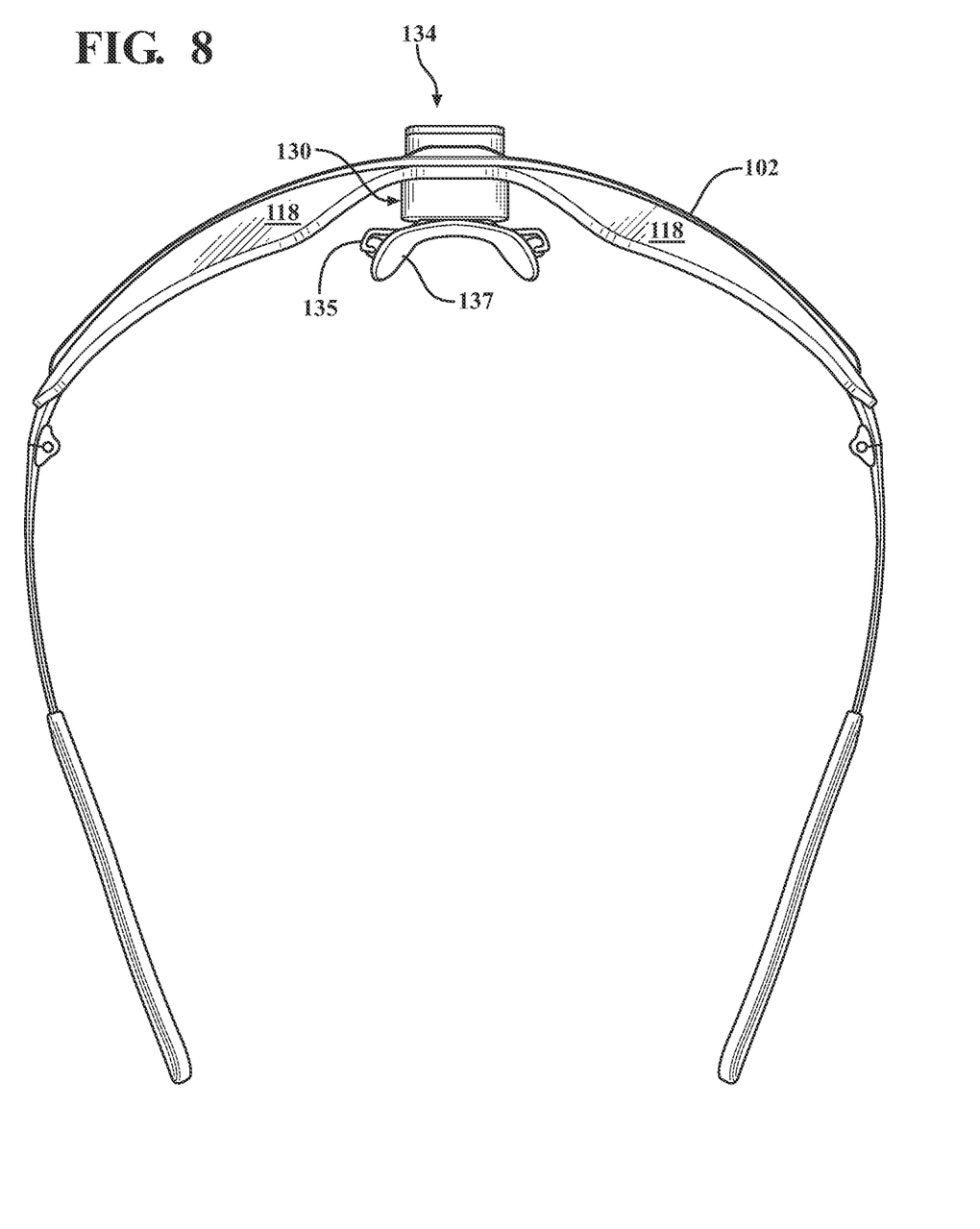
FIG. 8 is a bottom view.
Figure 9:
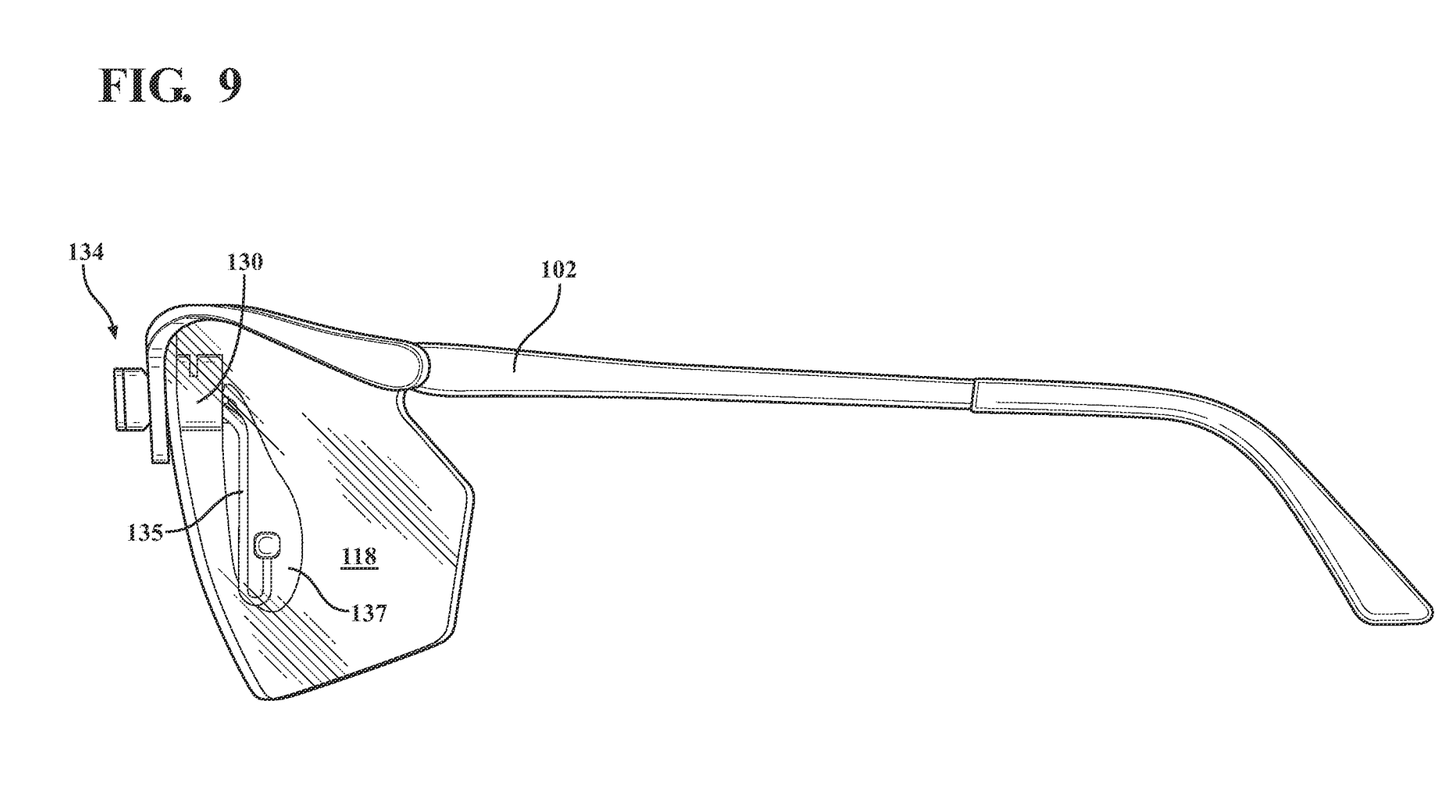
FIG. 9 is a side view.

FIGS. 3-9 provide different views of the preferred embodiment in assembled form. In particular, FIG. 3 is a detail drawing of the bridge portion of the eyeglass frames showing the front and rear components. FIG. 4 is a front view of the bridge portion with a cap removed, also showing compatibility with through-the-lens (TTL) loupes. FIG. 5 is a rear view of the bridge portion. FIGS. 6, 7, 8, 9 are top-down front, top-down, bottom and side views, respectively.

The invention claimed is:

1. An optical mounting assembly adapted for use with wrap-around type eyeglass frames that have a bridge portion, and wherein the eyeglass frames are configured to receive a single sheet of curved lens material forming right and left lenses, the optical mounting assembly comprising:
   a front component configured for placement in front of the bridge portion of the eyeglass frames;
   a rear component configured for placement behind the bridge portion of the eyeglass frames;
   a first set of fasteners that extend from the front component to the rear component, whereby the bridge portion of the eyeglass frames and the lens material are sandwiched between the front component and the rear component; and
   a nose pad component coupled to the rear component;
   wherein the bridge portion of the eyeglass frames is situated in front of the curved lens material forming right and left lenses.

2. The optical mounting assembly of claim 1, wherein the front component includes a structure adapted to receive an optical viewing accessory.

3. The optical mounting assembly of claim 2, wherein the structure is a slot in the front component.

4. The optical mounting assembly of claim 2, wherein the optical viewing accessory is a forwardly directed illuminator.

5. The optical mounting assembly of claim 1, wherein the rear component includes a slot adapted to receive an optical accessory.

6. The optical mounting assembly of claim 5, wherein the optical accessory is a light-blocking filter or a light-admitting filter.

7. The optical mounting assembly of claim 1, wherein the nose pad component includes a pair of bendable wire arms that extend downwardly and outwardly from a plate fastened to the rear component.

8. The optical mounting assembly of claim 7, further comprising a cushioning material covering at least a portion of the bendable wire arms.

9. The optical mounting assembly of claim 1, further comprising a second set of fasteners coupling the nose pad component to the rear component, wherein:
   the first set of fasteners includes a first pair of fasteners disposed spaced apart from one another at a first distance;
   the second set of fasteners includes a second pair of fasteners disposed spaced apart from one another at a second distance; and
   the first distance and the second distance are different distances.

10. The optical mounting assembly of claim 1, further comprising a second set of fasteners coupling the nose pad component to the rear component, wherein the first set of fasteners and the second set of fasteners are threaded fasteners.

11. The optical mounting assembly of claim 1, further comprising a right ocular or loupe and a left ocular or loupe that extend through the lens material.

12. An optical mounting assembly, comprising:
   wrap-around type eyeglass frames having a bridge portion;
   a single sheet of curved lens material forming a right lens and a left lens;

a front component arranged in front of the bridge portion of the eyeglass frames;

a rear component arranged behind the bridge portion of the eyeglass frames;

at least one fastener coupling the front component, the bridge portion of the eyeglass frames, the lens material, and the rear component to one another, the at least one fastener extending from the front component through the bridge portion of the eyeglass frames and the lens material to the rear component such that the bridge portion of the eyeglass frames and the lens material are sandwiched between the front component and the rear component; and a nose pad component coupled to the rear component.

13. The optical mounting assembly of claim 12, wherein the bridge portion of the eyeglass frames is situated in front of the curved lens material forming right and left lenses.

14. The optical mounting assembly of claim 12, wherein the front component includes a structure adapted to receive an optical viewing accessory.

15. The optical mounting assembly of claim 12, wherein the rear component includes a slot adapted to receive a light-blocking filter or a light-admitting filter disposed between the lens material and eyes of a wearer.

16. The optical mounting assembly of claim 12, wherein the nose pad component includes:
a pair of bendable wire arms that extend downwardly and outwardly; and
a cushioning material covering at least a portion of the bendable wire arms.

17. The optical mounting assembly of claim 12, further comprising a right ocular or loupe and a left ocular or loupe that extend through the lens material.

18. The optical mounting assembly of claim 12, wherein the front component includes a slot adapted to receive an optical viewing accessory.

19. An optical mounting assembly adapted for use with wrap-around type eyeglass frames that have a bridge portion, and wherein the eyeglass frames are configured to receive a single sheet of curved lens material forming right and left lenses, the optical mounting assembly comprising:
a front component configured for placement in front of the bridge portion of the eyeglass frames;
a rear component configured for placement behind the bridge portion of the eyeglass frames;
a first set of fasteners coupling the front component, the bridge portion of the eyeglass frames, the lens material, and the rear component to one another, the first set of fasteners extending through the bridge portion of the eyeglass frames and the lens material from the front component to the rear component such that the bridge portion of the eyeglass frames and the lens material are sandwiched between the front component and the rear component; and
a nose pad component coupled to the rear component;
wherein the front component includes a slot adapted to receive an optical viewing accessory.

20. An optical mounting assembly adapted for use with wrap-around type eyeglass frames that have a bridge portion, and wherein the eyeglass frames are configured to receive a single sheet of curved lens material forming right and left lenses, the optical mounting assembly comprising:
a front component configured for placement in front of the bridge portion of the eyeglass frames;
a rear component configured for placement behind the bridge portion of the eyeglass frames;
a first set of fasteners that extend from the front component to the rear component, whereby the bridge portion of the eyeglass frames and the lens material are sandwiched between the front component and the rear component;
a nose pad component coupled to the rear component; and
a second set of fasteners coupling the nose pad component to the rear component;
wherein the first set of fasteners includes a first pair of fasteners disposed spaced apart from one another at a first distance;
wherein the second set of fasteners includes a second pair of fasteners disposed spaced apart from one another at a second distance; and
wherein the first distance and the second distance are different distances.

21. An optical mounting assembly adapted for use with wrap-around type eyeglass frames that have a bridge portion, and wherein the eyeglass frames are configured to receive a single sheet of curved lens material forming right and left lenses, the optical mounting assembly comprising:
a front component configured for placement in front of the bridge portion of the eyeglass frames;
a rear component configured for placement behind the bridge portion of the eyeglass frames;
a first set of fasteners that extend from the front component to the rear component, whereby the bridge portion of the eyeglass frames and the lens material are sandwiched between the front component and the rear component;
a nose pad component coupled to the rear component; and
a second set of fasteners coupling the nose pad component to the rear component;
wherein the first set of fasteners and the second set of fasteners are threaded fasteners.

* * * * *